(12) United States Patent
Endo et al.

(10) Patent No.: US 10,393,412 B2
(45) Date of Patent: *Aug. 27, 2019

(54) CRYOCOOLER REGENERATOR MATERIAL, CRYOGENIC REGENERATOR, REGENERATIVE CRYOCOOLER AND SYSTEM COMPRISING REGENERATIVE CRYOCOOLER

(71) Applicant: Kabushiki Kaisha Toshiba, Minato-ku (JP)

(72) Inventors: Masaki Endo, Tokyo (JP); Akiko Saito, Kawasaki (JP); Koichi Harada, Tokyo (JP); Norihiro Tomimatsu, Mitaka (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/263,584

(22) Filed: Sep. 13, 2016

(65) Prior Publication Data

US 2017/0122625 A1 May 4, 2017

(30) Foreign Application Priority Data

Sep. 17, 2015 (JP) .................................. 2015-183667

(51) Int. Cl.
*C09K 5/14* (2006.01)
*F25B 9/14* (2006.01)

(52) U.S. Cl.
CPC .................. *F25B 9/14* (2013.01); *C09K 5/14* (2013.01); *F25B 2309/003* (2013.01)

(58) Field of Classification Search
CPC ......... C09K 5/14; F25B 9/14; F25B 2309/003
USPC ........... 62/6, 638, 641, 909, 600; 252/67, 70
See application file for complete search history.

(56) References Cited

U.S. PATENT DOCUMENTS

| | | | | |
|---|---|---|---|---|
| 4,296,147 A * | 10/1981 | Lawless | ..................... | F25B 9/14 423/116 |
| 4,354,355 A * | 10/1982 | Lawless | ..................... | F25B 9/14 165/10 |
| 5,537,826 A * | 7/1996 | Gschneidner, Jr. | ........ | F25B 9/14 148/301 |
| 5,593,517 A * | 1/1997 | Saito | ....................... | B82Y 25/00 148/301 |
| 6,318,090 B1 * | 11/2001 | Gschneidner, Jr. | ........ | F25B 9/14 62/6 |
| 7,226,543 B2 * | 6/2007 | Takagimi | ............ | C01F 17/0093 165/4 |
| 7,285,881 B2 * | 10/2007 | Steinmeyer | .............. | H02K 9/00 310/52 |
| 7,404,295 B2 * | 7/2008 | Li | ........................... | F25B 9/145 165/4 |
| 10,101,061 B2 * | 10/2018 | Eguchi | ..................... | C01G 5/00 |
| 2002/0130747 A1 * | 9/2002 | Ito | ............................. | H01F 6/00 335/299 |
| 2005/0217280 A1 * | 10/2005 | Gschneidner, Jr. | ...... | F25B 9/145 62/6 |
| 2005/0223714 A1 * | 10/2005 | Li | ............................ | F25B 9/145 62/6 |
| 2007/0227159 A1 | 10/2007 | Murayama et al. | | |
| 2008/0104987 A1 | 5/2008 | Toshimi Satoh | | |
| 2013/0216901 A1 * | 8/2013 | Ortega | .................... | H01M 4/34 429/206 |
| 2014/0308176 A1 * | 10/2014 | Golden | ............... | C01B 21/0416 422/187 |
| 2014/0374054 A1 * | 12/2014 | Xu | .......................... | F28D 17/02 165/10 |
| 2015/0210911 A1 * | 7/2015 | Yamada | ................... | C09K 5/08 505/150 |
| 2015/0219366 A1 * | 8/2015 | Yamada | .................... | F25B 9/14 62/6 |
| 2016/0045841 A1 * | 2/2016 | Kaplan | ................ | B01J 19/0093 429/49 |
| 2018/0051916 A1 * | 2/2018 | Eguchi | .................... | F25B 9/145 |

FOREIGN PATENT DOCUMENTS

| | | |
|---|---|---|
| JP | 6-101915 A | 4/1994 |
| JP | 9-14774 A | 1/1997 |
| JP | 2004-189906 | 7/2004 |
| JP | 2004-225920 A | 8/2004 |
| JP | 2005-75963 A | 3/2005 |
| JP | 2006-242484 A | 9/2006 |
| JP | 2006-242484 A5 | 9/2006 |
| JP | 2011-117698 | 6/2011 |
| JP | 5127226 B2 | 1/2013 |
| JP | 5578501 B2 | 8/2014 |
| WO | WO 03/081145 A1 | 10/2003 |

OTHER PUBLICATIONS

Translation of JP 2004225920, dated Aug. 12, 2004. (Year: 2004).*
Roger E. Gerkin, et al., "Silver Oxide: The Heat Capacity of Large Crystals from 14 to 300° K.", Journal of the American Chemical Society, vol. 84, 1961, pp. 2662-2664 (submitting pp. 2662-2671).

(Continued)

*Primary Examiner* — Douglas J McGinty

(74) *Attorney, Agent, or Firm* — Oblon, McClelland, Maier & Neustadt, L.L.P.

(57) ABSTRACT

One embodiment provides a cryogenic regenerator material containing as the main constituent at least one compound (A) containing at least one metallic element M and at least one non-metallic element X selected from O, S, N and F. The compound (A) in the cryogenic regenerator material has a half width of a main peak of 0.2 degrees or more obtained by the powder X-ray diffraction measurement.

17 Claims, 4 Drawing Sheets

(56) References Cited

OTHER PUBLICATIONS

A. P. Ramirez, et al., "Large Low Temperature Specific Heat in the Negative Thermal Expansion Compound $ZrW_2O_8$", Physical Review Letters, vol. 80, No. 22, 1998, pp. 4903-4906.

Lawrence V. Gregor, "The Heat Capacity of Cuprous Oxide from 2.8 to 21° K.", The Journal of Physical Chemistry, vol. 66, 1962, pp. 1645-1647.

* cited by examiner

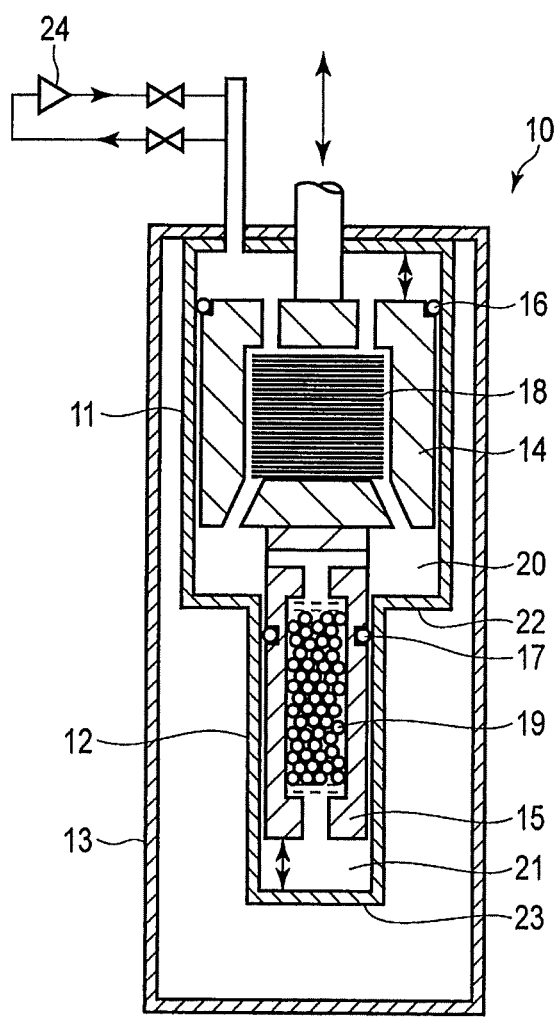
F I G. 4

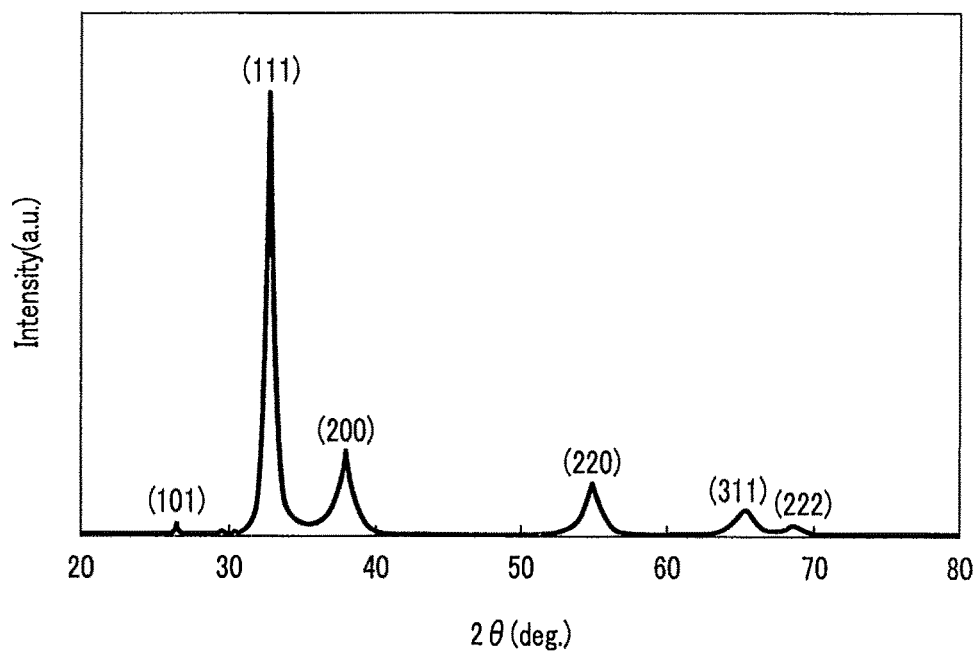
F I G. 5
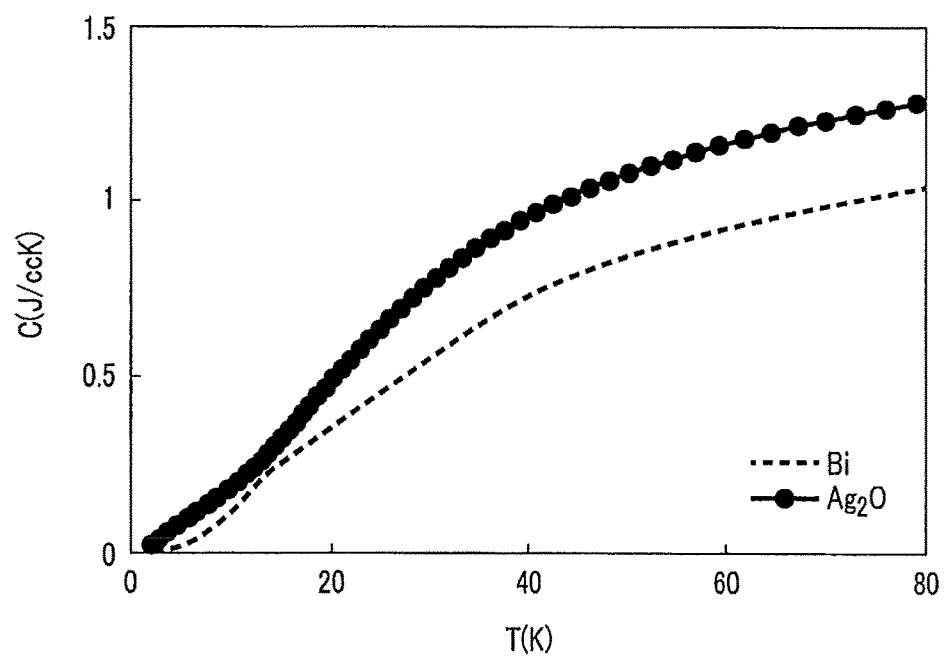
F I G. 6

CRYOCOOLER REGENERATOR MATERIAL, CRYOGENIC REGENERATOR, REGENERATIVE CRYOCOOLER AND SYSTEM COMPRISING REGENERATIVE CRYOCOOLER

CROSS-REFERENCE TO RELATED APPLICATION

This application is based upon and claims the benefit of priority from Japanese Patent Application No. 2015-183667 filed Sep. 17, 2015, and entire contents of which are incorporated herein by reference.

FIELD

Embodiments described herein relate to a cryogenic regenerator material, a cryogenic regenerator, a regenerative cryocooler and a system comprising a regenerative cryocooler.

BACKGROUND

A superconducting magnet used in the systems such as a Magnetic Resonance Imaging system (MRI) works at a cryogenic temperature of several tens of K or lower. In general, this cryogenic ambient condition is generated by regenerative cryocoolers such as the Gifford-McMahon (GM) cryocoolers. In the regenerative cryocoolers, appropriate regenerator materials are used in consideration of their temperature dependences of specific heat. Currently, commonly used Gifford-McMahon coolers comprise materials of Cu, Pb and rare earth-based compounds such as $HoCu_2$ or $Er_3Ni$ as the regenerator materials working effectively for a temperature range from room temperature to about 100 K, for a temperature range from about 100 K to 10 K, and for a cryogenic temperature range below 10 K, respectively.

In recent years, Pb has been considered to be a material which has a high burden on the environment, and a regenerator material which does not contain Pb is required. Before now, materials such as Bi, Sn and their compounds were proposed.

However, there has been a problem that the materials such as Bi, Sn and the compounds containing them as main components have insufficient specific heat at low temperatures, and thus the cooling properties of the cryocoolers using regenerators filled with such materials as the regenerator materials are inferior to those of cryocoolers using Pb.

In the regenerative cryocoolers such as Gifford-McMahon cryocoolers, pulse tube cryocoolers and Stirling coolers, high-pressure working gas is made flow reciprocally through the void in the regenerator filled with regenerator materials. Furthermore, in the case of Gifford-McMahon cryocoolers and Stirling cryocoolers, regenerators themselves filled with regenerator materials also move reciprocally. Therefore, regenerator materials are required to have mechanical strength against them.

BRIEF DESCRIPTION OF THE DRAWINGS

FIG. 4 is a cross-sectional view illustrating the main constitution of a regenerative cryocooler according to an embodiment;

FIG. 5 is a diagram illustrating the result of XRD measurement performed on a cryogenic regenerator material according to an embodiment; and FIG. 6 is a diagram illustrating the results of specific heat measurements performed on a cryogenic regenerator material according to an embodiment and a reference regenerator material.

DETAILED DESCRIPTION

Figure 1A:
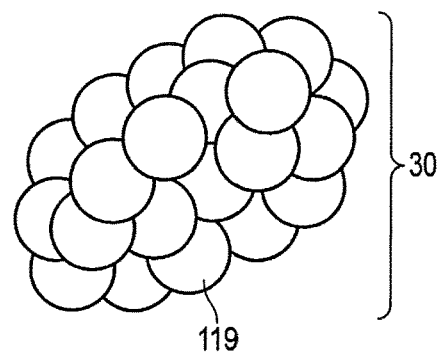
FIGS. 1A and 1B are views schematically illustrating the shape of a cryogenic regenerator material according to an embodiment.

A cryogenic regenerator material in an embodiment contains as the main constituent at least one compound (A) comprising at least one metallic element M and at least one non-metallic element X selected from O, S, N and F.

In one embodiment, the half width of the main peak obtained by the powder X-ray diffraction measurement on the compound (A) is 0.2 degrees or more, and in another embodiment, the compound (A) has a crystal structure in which the non-metal atom X locates next to at least two metal atoms M as the nearest neighbor atoms.

Embodiments will now be described in detail.

Here, the cryogenic temperature described in this specification means, for example, a temperature range in which a superconducting phenomenon can be technically utilized, and indicates 100 K or less in one embodiment, and 20 K or less in another embodiment.

The cryogenic regenerator materials according to the embodiments contain as the main constituent the compound (A) comprising at least one metallic element M and at least one non-metallic element X selected from O, S, N and F.

As described above, the half width of the main peak obtained by the powder X-ray diffraction (XRD) measurement on the compound (A) is 0.2 degrees or more (hereinafter, referred to as "specific half width") in one embodiment, and the compound (A) has a crystal structure in which the non-metal atom X locates next to at least two metal atoms M as the nearest neighbor atoms (hereinafter, referred to as "specific crystal structure") in another embodiment.

In a material containing a metallic element M and a non-metallic element X (O, S, N, F) and having the specific crystal structure, the "librational motion of atoms" occurs at around a particular atom (A. P. Ramirez et al., Physical Review Letters, vol. 80, pp. 4903-4906 (1998)). As a result of examining a lot of materials, it was found that the above-mentioned "librational motion of atoms" induce an enhancement of specific heat in a cryogenic temperature range.

Furthermore, as a result of ingenuity and diligent efforts to produce powder aggregates having a practical shape as a regenerator material and few defectives in order to obtain large specific heat per unit volume, a bulk with a high density ratio to the theoretical density was successfully obtained. The obtained bulk was confirmed to have sufficiently high specific heat per unit volume in comparison with the conventional regenerator materials.

As described above, regenerator materials are required to have mechanical strength. When the volume of a material largely changes with change in temperature, the change in volume would lead to crack generation. When fine powder comes from the material, the fine powder would contribute to increase of the pressure loss of working gas and damage of the seal for the working gas leakage so as to deteriorate the cooling performance of the cryocooler.

As a result of further diligent researches on the compound (A) having the specific crystal structure, it was found that the regenerator material containing as the main component the compound (A) having the specific crystal structure also had excellent mechanical strength, although the reason is unclear.

As a further solution for obtaining the mechanical strength required for regenerator materials, the present inventors also found that when the crystallite diameter is fine, changes in volume was restricted in a micro-region to suppress crack evolution. Actually, it was found that when the crystallite diameter was made fine by devising a heat treatment process, the mechanical strength was improved.

It was found that the crystallite diameter size and the spectrum of X-ray diffraction were correlated, and specifically when the half width of the main peak in XRD of the compound (A) is 0.2 degrees or more, good mechanical strength was obtained.

As a result of further diligent investigations, when the crystallite diameter was fine, preferable specific heat was observed in a cryogenic temperature range, although the reason is unclear.

In the embodiments, the half width of the main peak in the XRD pattern obtained on the compound (A) is preferably 0.3 degrees or more, and more preferably 0.5 degrees or more. The upper limit is not particularly limited, and for example, is preferably 3 degrees or less and more preferably 2.5 degrees or less.

Here, the main peak in the XRD pattern means a peak with the highest diffraction intensity in the measured XRD pattern.

In the embodiments, it is preferred that the compound (A) have both the specific half width and the specific crystal structure.

The cryogenic regenerator materials according to the embodiments are, for example, preferably powder aggregates, and more preferably a bulk body, which is a sintered body of the powder aggregates. When the cryogenic regenerator material is a bulk body, the material can have a high density ratio comparing with the theoretical value.

In regenerative cryocoolers such as Gifford-McMahon cryocoolers, pulse tube cryocoolers and Stirling coolers, a working gas such as helium gas reciprocally flows through the void in the regenerator filled with regenerator materials. Therefore, the regenerator materials according to the embodiments are only required to be ones with a shape and size which do not block the flow of a working gas and can promote heat exchange with the working gas when filled in a regenerator. Such regenerator material can be a porous body, is not necessarily to be a porous body, can be a bulk body with through-holes, or can be a bulk body without through-holes.

Figure 2A:
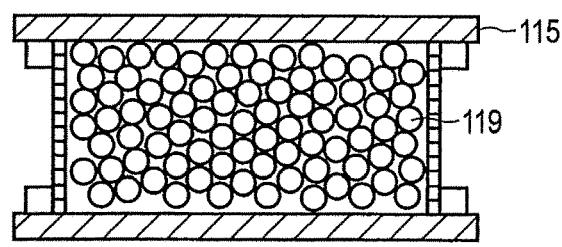
FIGS. 2A to 2C are cross-sectional views illustrating the main constitution in a cryogenic regenerator according to an embodiment.

In one specific embodiment, the cryogenic regenerator materials according to the embodiments are in a form of particles, which are powder aggregates, or particle-shaped bulk bodies obtained by sintering the aggregates. FIG. 2A is a cross-sectional view illustrating the main constitution of a cryogenic regenerator according to an embodiment, in which a cryogenic regenerator 115 is filled with a regenerator material 119 in a form of particles.

Figure 2B:
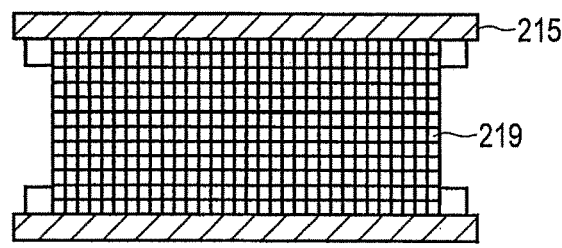

In another specific embodiment, a cryogenic regenerator material can have a mesh structure. FIG. 2B is a cross-sectional view illustrating the main constitution of a cryogenic regenerator according to an embodiment, and a cryogenic regenerator material 219 with a mesh structure is placed in a cryogenic regenerator 215.

Figure 2C:
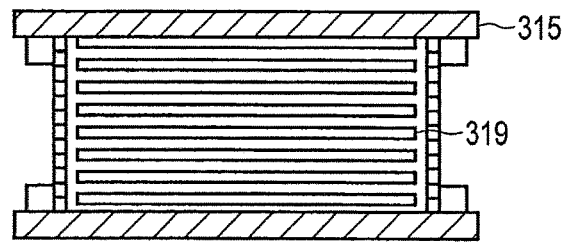

In another specific embodiment, a cryogenic regenerator material can have a laminar or corrugated structure. FIG. 2C is a cross-sectional view illustrating the main constitution of a cryogenic regenerator according to an embodiment, in which laminar cryogenic regenerator materials 319 are arranged in a cryogenic regenerator 315 at a predetermined interval.

As another specific embodiment of the cryogenic regenerator 315 illustrated in FIG. 2C, a corrugated cryogenic regenerator material can be used in place of the laminar cryogenic regenerator material 319, and a plurality of corrugated regenerator materials can be arranged in the regenerator of the cryocooler to form a honeycomb structure (not shown).

In terms of a filling rate in a regenerator, reduction of a pressure loss of working gas (not block the flow), and sufficient heat exchange between the regenerator material and the working gas, the cryogenic regenerator materials according to the embodiments are preferably in a form of particles formed of powder aggregates, and more preferably particle-shaped bulk bodies, which are sintered bodies thereof.

Here, the particle shape can be any shape such as spherical particles, spheroidal particles and bale-shaped particles, and it is preferred that the equivalent sphere diameter is 0.1 mm or more.

The equivalent sphere diameter of 0.1 mm or more is preferred in terms of decreasing the pressure loss of working gas to improve the refrigeration performance. The equivalent sphere diameter is more preferably 0.15 mm or more.

The regenerator material in a form of particles preferably has an equivalent sphere diameter of 1 mm or less. The equivalent sphere diameter of 1 mm or less is preferred in terms of increasing a ratio of total surface area to a filling rate to enhance the heat exchange between the regenerator material and a working gas, thereby improving the refrigeration performance. The equivalent sphere diameter is more preferably 0.6 mm or less and further preferably 0.3 mm or less.

Figure 1B:
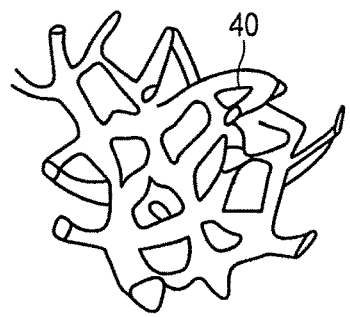

In other specific embodiments, the cryogenic regenerator materials according to the embodiments can be in a form of the above-described particles of powder aggregates, which are combined together to form a composite torus structure 30 having a shape like a bunch of grapes as shown in FIG. 1A or a blood capillary-shaped structure 40 as shown in FIG. 1B.

In one embodiment, the metallic element M contained in the compound (A) is preferably a metallic element selected from Cu, Ag, Au, Pd, Pt, Zr, Hf, Sc, Y, La, Ba, Ce, Lu, In, W, Mo, Nb, Ta, V and Al. These metallic elements are effective to stabilize the specific crystal structure of the compound (A) showing librational motion.

In one embodiment, the compound (A) is preferably a compound represented by the composition formula $Ma_2X$ or $MbW_2X_2$.

Here, Ma is a metallic element selected from Cu, Ag, Au, Pd and Pt, or two or more metallic elements comprising at least one selected from Cu, Ag, Au, Pd and Pt as the main constituent element.

Mb is a metallic element selected from Zr and Hf, or two or more metallic elements comprising at least one selected from Zr and Hf as the main constituent element.

X is at least a non-metallic element selected from O, S and N.

Examples of such compound include $Cu_2O$, $Ag_2O$, $ZrW_2O_8$ and the like.

In one embodiment, the content of the compound (A) in the cryogenic regenerator material is preferably 40% or more based on the whole volume of the cryogenic regenerator material. The compound (A) content of 40% or more is preferred in terms of obtaining large specific heat per unit volume in a cryogenic temperature range. The content of the compound (A) is more preferably 50% or more, and further preferably 80% or more.

The content of the compound (A) can be calculated by Rietveld analysis of X-ray diffraction or evaluating the ratio of the phases in a plurality of fields of view in the SEM observation.

The density of the cryogenic regenerator materials according to the embodiments are preferably 60% or more with respect to the theoretical density of the compound (A).

The ratio of the density of the regenerator material to the theoretical density of the compound (A) (hereinafter, also referred to as "theoretical density ratio") of 60% or more is preferred in terms of obtaining large specific heat per unit volume in a cryogenic temperature range. That is also preferred in terms of obtaining high thermal conductivity to sufficiently provide the material's regenerative effect.

The theoretical density ratio of the cryogenic regenerator material according to each embodiment is more preferably 70% or more and further preferably 80% or more.

As long as the regenerator materials according to the embodiments have the above-described density, in the case where the regenerator material has a bulk body shape such as a spherical shape, a porous body shape, a sheet shape, and the other various shapes, an influence of large changes in temperature on changes in volume can be limited in a micro-region, and a longer operating life of the regenerator material can be achieved, and an improvement in heat exchange efficiency and a reduction of loss by a pressure drop can be achieved simultaneously.

Here, the theoretical density is defined as a value obtained by dividing the molecular weight of the compound (weight per mol) by molar volume calculated using the lattice constants of the compound determined by XRD analysis.

In one embodiment, the compound (A) preferably has a crystal structure which includes at least one unit structure selected from a tetrahedral framework and octahedral framework each comprising at least one non-metallic element X and at least one metallic element M.

In the above-mentioned tetrahedral framework or octahedral framework, each vertex is occupied by the metallic element M with the center occupied by the non-metallic element X, or each vertex is occupied by the non-metallic element X with the center occupied by the metallic element M.

Preferably, the compound (A) comprises two or more unit structures selected from the above-mentioned tetrahedral and octahedral frameworks in the crystal structure, and at least one unit structure shares a vertex with at least one neighboring unit structure.

It was found that when the compound (A) has the above-mentioned structure, the "librational motion of atoms" occurs at around a particular atom, and the effect of enhancement of the specific heat was clearly obtained in a cryogenic temperature range.

In one embodiment, the compound (A) preferably has a negative thermal expansion coefficient in the whole temperature range from 4 K to 100 K.

Although the cryogenic regenerator material is used in a cryogenic temperature range, a preliminary work of filling the regenerator material into a regenerator is generally carried out at room temperature in the step of assembling a cryocooler. Therefore, in the case where a substance having a positive thermal expansion coefficient is used as the regenerator material, even when the substance is tightly filled into a regenerator at room temperature, voids increase with decreasing temperature to a cryogenic temperature, which can cause a backlash. This would cause abrasion and cracks of the regenerator materials due to the reciprocal movement of the regenerator and the reciprocal movement of the working gas in the regenerator during operation of the cryocooler, which lead to deterioration of the cooling properties.

In the case of using the compound (A) exhibiting a negative thermal expansion in the cryogenic temperature range, a risk of backlash in the regenerator can be suppressed in a cryogenic operating environment, and thus a high durability against the reciprocal movement of the regenerator can be achieved even when the cryocooler is under conditions of continuous operation.

Here, the "thermal expansion coefficient" means coefficients of changes in material length (linear expansion) and changes in volume (volume expansion) by temperature change, and is a value obtained by evaluating a volume expansion from the measurement of linear expansion coefficient by TMA (Thermal Mechanical Analysis), or by the measurement with a strain gauge.

The cryogenic regenerator materials according to the embodiments preferably contain a substance with a positive thermal expansion coefficient in the temperature range from 4 K to 100 K or a ductile metal.

As described above, a regenerator material is subjected to cycles in which temperature varies greatly, for example, room temperature during the step of assembling a cryocooler and also room temperature at the start operation, while cryogenic temperature during stable operation. In order to suppress abrasion and cracks due to repeated changes in volume caused by the above cycles in which temperature varies greatly, it is effective that materials with positive and negative thermal expansion coefficients are used in combination or the compound (A) is used in a form of a composite with a ductile metal so that strain is relaxed.

Here, the composite of the compound (A) with the ductile metal will be described.

Unlike metals, compounds such as oxides, sulfides, nitrides and fluorides do not generally have ductility. In the case where it is used in a form of a composite with a ductile metal in order to further improve the reliability while maintaining cooling properties in cooling cycle operation over a long period of time, even when fine cracks occur, these are confined within a local region. Thus, the development of cracks to the whole, breakage and the like are prevented. Further, the occurrence of fines is suppressed. Therefore, the reliability of coolers is improved.

Figure 3A:
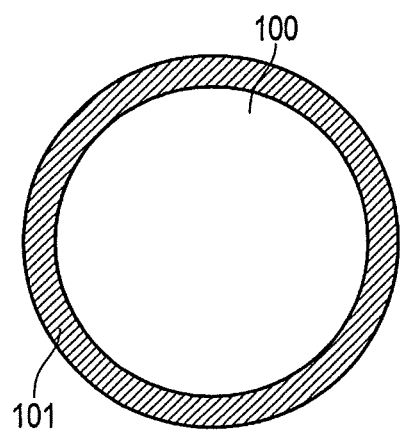
FIGS. 3A and 3B are cross-sectional views schematically illustrating a composite compound of a compound (A) and a ductile metal contained in a cryogenic regenerator material according to an embodiment.
Figure 3B:
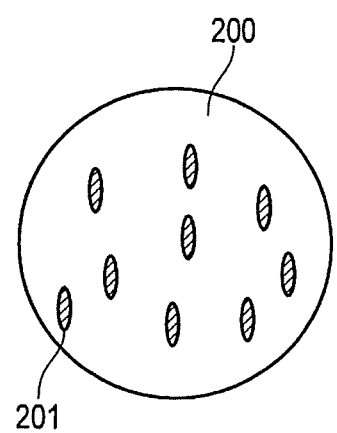

As shown in FIG. 3A, the composite material preferably has a core-shell structure in which the compound (A) 100 as the main constituent phase is the core, and the ductile metal 101 as the subconstituent phase uniformly covering the core. Alternatively, as shown in FIG. 3B, the composite material desirably has a structure in which the ductile metal 201 as the subconstituent phase is uniformly dispersed in the compound (A) 200 as the main constituent phase. These structures allow the strain caused by changes in volume of compound (A) to be relaxed and make it possible to suppress the occurrence of cracks and fines so as to improve the reliability of the cryocooler.

The ductile metal is not particularly limited. Examples thereof include Ag, Cu and the like.

When the cryogenic regenerator materials according to the embodiments contain a ductile metal, the content is preferably 0.2% or more, more preferably 2% or more, and further preferably 5% or more based on the whole volume of the regenerator material.

The ductile metal content is preferably 50% or less, more preferably 40% or less, and further preferably 30% or less based on the whole volume of the regenerator material in terms of specific heat properties.

The substance with a positive thermal expansion coefficient is only required to be a substance with a positive thermal expansion coefficient in the temperature range from 4 K to 100 K, and such substance includes Ag, Cu and the like.

When the cryogenic regenerator materials according to the embodiments contain a substance with a positive thermal expansion coefficient, the content is preferably 0.2% or more, more preferably 2% or more, and further preferably 5% or more based on the whole volume of the regenerator material.

The content of the substance with a positive thermal expansion coefficient is preferably 50% or less, more preferably 40% or less, and further preferably 30% or less based on the whole volume of the regenerator material in terms of specific heat properties.

The cryogenic regenerator materials according to the embodiments preferably contain a material with a higher thermal conductivity than that of the compound (A) (hereinafter, also referred to as "high thermal conductivity material").

In the regenerative cryocooler, the working gas such as helium gas reciprocally flows through the void in the regenerator filled with regenerator materials. When the regenerator material contains the material with a higher thermal conductivity than that of the compound (A), heat exchange between the regenerator material and working gas in a period during which the working gas reciprocally flows is promoted. It is important that heat received on the surface of the material smoothly propagates to the inside of the regenerator material. Therefore, when the compound (A) and the high thermal conductivity material are combined into a composite to raise thermal conductivity, the regenerative efficiency can be increased and the cooling properties can be improved. The forms of this composite are the same as those described for the composite of the compound (A) and the ductile metal.

When the cryogenic regenerator materials according to the embodiments contain $Ag_2O$ as the compound (A), it is preferred that Ag as the high thermal conductivity material is combined with $Ag_2O$ to form a composite. In this case, the effect of improving both high thermal conductivity and ductility is obtained because Ag has ductility.

When a metal material is processed into particles, methods such as a centrifugal spray method and an atomization method are generally used. In these methods, molten metal is sprayed in a form of particles into a fluid (gas or liquid). Each particle has a spherical shape due to surface tension-induced self-shaping, and is cooled into a solidified spherical particle. It is, however, difficult to produce the cryogenic regenerator material according to the embodiments by the above-mentioned means due to the intrinsic features thereof. Therefore, preferred methods are a method in which granulation by a rolling granulation, etc., formation of spheres each formed of the granules, and sintering of them in an inert gas atmosphere are performed in this order; and a method in which the granulation, mixing of the granules with a binder, formation of particles by dropping the mixture into liquid, and drying and sintering of the particles are performed in this order.

It is also effective that a bulk body is produced by spark plasma sintering. As described above, the shape of the regenerator material is not limited to the spherical shape, and can be a porous ceramic sheet or the like.

The regenerator materials according to the embodiments can also be produced, for example, by mixing $Ag_2O$ powder with a resin binder, compression-molding the mixture and sintering the mixture. In this case, it is important to appropriately select the type and amount of resin binder and sintering conditions.

It is preferred that the type of the resin binder is selected considering the combustion temperature to disappear it and the sintering temperature. When the sintering temperature is too low, a large amount of resin binder remains in a sintered body and the theoretical density ratio cannot be made higher. When the sintering temperature is too high, the proportion of $Ag_2O$ compound becomes low due to Ag precipitates, and suitable specific heat properties cannot be obtained. The amount of the resin binder at the time of mixing raw materials is preferably 10% by mass or less of the whole amount in terms of obtaining a higher theoretical density ratio.

A regenerative cryocooler according to an embodiment will now be described.

FIG. 4 is a cross-sectional view illustrating the main constitution of a regenerative cryocooler according to an embodiment, which is of a two-stage expansion type. The two-stage regenerative cryocooler 10 shown in FIG. 4 is an example of a cryocooler. The two-stage cryocooler 10 shown in FIG. 4 includes a vacuum vessel 13 in which a first cylinder 11 with a large diameter and a second cylinder 12 with a small diameter coaxially connected with the first cylinder 11 are installed. A first regenerator 14 is reciprocal movably mounted in the first cylinder 11, and a second regenerator 15, which is the cryogenic regenerator according to an embodiment, is reciprocal movably mounted in the second cylinder 12.

Sealing rings 16 and 17 are arranged between the first cylinder 11 and the first regenerator 14 and between the second cylinder 12 and the second regenerator 15, respectively.

First regenerator material 18 such as Cu meshes are arranged in the first regenerator 14. The cryogenic regenerator materials according to any of the embodiments are filled as second regenerator materials 19 in the second regenerator 15 in a predetermined proportion. The first regenerator 14 and the second regenerator 15 each have channels for a working medium such as He gas, which are provided, for example, through the void in the first regenerator 14 filled with the first regenerator materials 18 and the void in the second regenerator 15 filled with the cryogenic regenerator materials 19.

A first expansion chamber 20 is provided between the first regenerator 14 and the second regenerator 15. A second expansion chamber 21 is provided between the second regenerator 15 and the end wall of the second cylinder 12. A first cooling stage 22 is formed on the bottom of the first expansion chamber 20, and a second cooling stage 23, having a temperature lower than that of the first cooling stage 22, is formed on the bottom of the second expansion chamber 21.

A high-pressure working medium (e.g. He gas) is supplied to the two-stage regenerative cryocooler 10 as described above from a compressor 24. The supplied working medium flows through the pass in the first regenerator materials 18 in the first regenerator 14 to reach the first expansion chamber 20, and further flow through the pass in the cryogenic regenerator materials (second regenerator materials) 19 in the second regenerator 15 to reach the second expansion chamber 21. In this process, the working medium is cooled in exchange for supplying thermal energy to the regenerator materials 18 and 19. After flowing through the pass in the regenerator materials 18 and the pass in the regenerator materials 19, the working medium expands in the expansion chambers 20 and 21 to generate cold, which cools the cooling stages 22 and 23. The expanded working medium flows through the pass in the regenerator materials 18 and the pass in the regenerator materials 19 in the reverse direction. The working medium receives thermal energy from the regenerator materials 18 and 19 and is then discharged. The cryocooler is configured to improve the heat efficiency of working medium cycle and achieve even lower temperature as a heat recovery effect is enhanced in such process.

In another embodiment, provided is a system comprising the regenerative cryocooler according to any of the above-described embodiments.

Examples of such system include superconducting magnet apparatus, magnetic resonance imaging (MRI) apparatus, cryopump apparatus, Josephson voltage standard system, and magnetic field-applied single crystal pulling apparatus each comprising the regenerative cryocooler according to any of the embodiments.

The embodiments described in this specification are presented for illustrative purposes, and the scope of the present invention is not limited thereto.

Some embodiments will be described in detail with reference to the following examples.

<Measurement Methods>

Measurement methods will now be described.

[Composition Analysis]

In the embodiments, the composition analysis of a regenerator material can be carried out using a redox titration method. A specimen is pulverized to obtain fine powder with size of about 10 μm or less, and the analysis is then carried out. The measurement is carried out on a portion randomly selected. The number of measurements is at least 10, desirably 25; and for each element, the average of the measured values from which the maximal value and the minimum value are excluded is used as a compositional value.

The measurement can be also carried out using scanning electron microscopy-energy dispersive X-ray spectrometry (SEM-EDX) or transmission electron microscopy-energy dispersive X-ray spectrometry (TEM-EDX). It is desired that the measurement is carried out using SEM-EDX at a magnification of 400 to 1 k to measure over a wide field of view. In a single field of view, at least 10 points are randomly selected and the measurements are performed on the points; and for each element, the average of measured values from which the maximal value and the minimum value are excluded is used as a compositional value.

In the case of a regenerator material with a fine composite structure, TEM-EDX analysis is used. It is desired that the TEM-EDX analysis be carried out at a magnification of 10 k to 100 k. In a single field of view, at least 10 points are randomly selected and the measurements are performed on the points; and for each element, the average of measured values from which the maximal value and the minimum value are excluded is used as a compositional value. When the measurement resolution of TEM-EDX is insufficient, the measurement is carried out using EELS, HAADF, and three-dimensional atom probe (3DAP). The measurement samples properly cut are used. Cut surfaces are randomly selected.

ICP emission spectrometry, X-ray photoelectron spectrometry (XPS), atomic absorption spectrometry (AAS), combustion ion chromatography can be also used. Oxygen, nitrogen/carbon and sulfur analyzers can be also used.

[Identification of Crystal Structure]

The crystal structure is identified using X-ray diffraction (XRD). A sample is placed on a stage and the XRD measurement is performed thereon. It is desired that the measurement be carried out in a range from 5° to 90° by a θ-2θ method to examine whether a phase other than the main constituent phase is precipitated. The constituent ratios can be also obtained by Rietveld analysis for a plurality of phases with different crystal structures.

EXAMPLES 1 to 7

2 g of $Ag_2O$ powder prepared by a wet process was weighed and filled in a carbon die. The die was set up in a spark plasma sintering apparatus (SPS apparatus), and the powder was sintered under conditions of a pressure of 40 MPa, a temperature of 300° C. and a sintering duration of 30 minutes to obtain a cylindrical sintered body with a diameter of 10 mm (Example 1). The density of the obtained sintered body was 97% with respect to the theoretical density. As a result of structure evaluation by X-ray diffraction, it was found that an almost single phase of $Ag_2O$ with a $Cu_2O$-type crystal structure was obtained as shown in FIG. 5. The half width of the main peak of the main phase was 0.53. This sample was observed by SEM, and consequently it was verified that Ag was slightly precipitated. This precipitation of Ag was in trace amounts, and could not be detected by X-ray diffraction due to slight amounts.

Next, a part of this sintered body was cut out to produce a square sample measuring about 2 mm side. Then, a specific heat property of the sample was measured using a physical property measurement system (PPMS) and the entropy was evaluated. Consequently, the specific heat C at 60 K was 1.15 J/(cc·K) (see FIG. 6).

Sintered bodies in Examples 2 to 7 were prepared by the same method as in Example 1 except for the powder mass, pressure, sintering temperature and sintering duration; and the measurement of density and X-ray diffraction analysis were performed. The conditions and evaluation results in Examples 2 to 7 are shown in Table 1 given below. In Examples 2 to 7, specific heat was almost the same as that in Example 1.

TABLE 1

| | Powder mass (g) | Pressure (Mpa)) | Sintering temperature (° C.) | Sintering duration (min) | Theoretical density ratio (%) | Evaluation results by X-ray diffraction | | | Specific heat at 60 K (J/ccK) |
|---|---|---|---|---|---|---|---|---|---|
| | | | | | | Main compound phase (crystal structure, volume fraction) | Other compound phase (crystal structure, volume fraction) | Half width of main peak of main compound phase | |
| Example 1 | 2.00 | 40 | 300 | 30 | 97 | $Ag_2O$ ($Cu_2O$-type, ~100%) | Ag (fcc, trace*) | 0.53 | 1.15 |
| Example 2 | 1.87 | 40 | 300 | 10 | 95 | $Ag_2O$ ($Cu_2O$-type, ~100%) | Ag (fcc, trace*) | 0.60 | 1.14 |
| Example 3 | 2.00 | 40 | 155 | 10 | 72 | $Ag_2O$ ($Cu_2O$-type, ~100%) | Ag (fcc, trace*) | 0.45 | 1.11 |
| Example 4 | 1.90 | 50 | 180 | 7 | 88 | $Ag_2O$ ($Cu_2O$-type, ~100%) | Ag (fcc, trace*) | 0.84 | 1.13 |
| Example 5 | 1.50 | 40 | 250 | 30 | 92 | $Ag_2O$ ($Cu_2O$-type, ~100%) | Ag (fcc, trace*) | 0.75 | 1.14 |
| Example 6 | 1.90 | 40 | 195 | 3 | 89 | $Ag_2O$ ($Cu_2O$-type, ~100%) | Ag (fcc, trace*) | 1.14 | 1.10 |
| Example 7 | 1.91 | 50 | 300 | 6 | 98 | $Ag_2O$ ($Cu_2O$-type, ~100%) | Ag (fcc, trace*) | 1.02 | 1.15 |

Trace: not more than detection limit

EXAMPLES 8 to 10

Bi (Example 8), Sn (Example 9) and Bi—Sn alloy (Example 10) were prepared as materials which are expected to exhibit relatively large specific heat that arises from lattice contribution in the temperature range of 100 K or less due to relatively low Debye temperatures thereof.

Next, each of them was cut out to produce a square sample measuring about 2 mm side, and the specific heat was evaluated and entropy was obtained. Consequently, the respective specific heats at 60 K were 0.9 J/(cc·K) (see FIG. 6), 0.8 J/(cc·K) and 0.85 J/(cc·K). The specific heat and the structural analysis by X-ray diffraction in Examples 8 to 10 are shown in Table 2 given below.

TABLE 2

| | Composition | Evaluation results by X-ray diffraction | | Specific heat at 60 K (J/ccK) |
|---|---|---|---|---|
| | | Main compound phase (crystal structure, volume fraction) | Other compound phase (crystal structure, volume fraction) | |
| Example 8 | Bi | Bi (As-type, ~100%) | None | 0.90 |
| Example 9 | Sn | Sn (αSn-type, ~100%) | None | 0.80 |
| Example 10 | BiSn | BiSn (As-type, ~100%) | None | 0.85 |

EXAMPLES 11 to 17

$Ag_2O$ powder prepared by a wet process and Ag powder with a purity of 99.9% were mixed enough and the obtained mixture was then sintered under conditions shown in Table 3 given below to obtain a cylindrical sintered body with a diameter of 10 mm (Examples 11 to 17). In Example 15, however, only $Ag_2O$ powder was used as a raw material. The pressure was 40 MPa in the SPS method and 20 MPa in the hot pressing method. The structural analysis by X-ray diffraction and specific heat evaluation of these examples were performed. The conditions and evaluation results in Examples 11 to 17 are shown in Table 3 given below. As a result of SEM observation, the Ag phase was clearly precipitated in Example 15 and the AgO phase was also observed in Example 17.

TABLE 3

| | Starting materials | | | Sintering temperature (° C.) | Sintering duration (min) | Products | | Specific heat at 60 K (J/ccK) |
|---|---|---|---|---|---|---|---|---|
| | $Ag_2O$ (g) | Ag (g) | Process | | | Main compound phase (crystal structure, volume fraction) | Other compound phase (crystal structure, volume fraction) | |
| Example 11 | 1.8 | 0.2 | Spark Plasma Sintering | 280 | 30 | $Ag_2O$ ($Cu_2O$-type, 80%) | Ag (fcc, 20%) | 1.13 |
| Example 12 | 1.6 | 0.4 | Spark Plasma Sintering | 280 | 10 | $Ag_2O$ ($Cu_2O$-type, 72%) | Ag (fcc, 28%) | 1.12 |
| Example 13 | 1.8 | 0.2 | Hot Pressing | 250 | 30 | $Ag_2O$ ($Cu_2O$-type, 75%) | Ag (fcc, 25%) | 1.11 |

TABLE 3-continued

| | Starting materials | | | Sintering | Sintering | Products | | |
| --- | --- | --- | --- | --- | --- | --- | --- | --- |
| | | | | | | Main compound phase (crystal | Other compound phase (crystal | Specific |
| | $Ag_2O$ (g) | Ag (g) | Process | temperature (° C.) | duration (min) | structure, volume fraction) | structure, volume fraction) | heat at 60 K (J/ccK) |
| Example 14 | 1.9 | 0.1 | Sintering in Oxygen | 280 | 30 | $Ag_2O$ ($Cu_2O$-type, 62%) | Ag (fcc, 38%) | 1.10 |
| Example 15 | 2 | None | Spark Plasma Sintering | 530 | 30 | Ag (fcc, 54%) | $Ag_2O$ ($Cu_2O$-type, 46%) | 0.80 |
| Example 16 | 1 | 1 | Spark Plasma Sintering | 300 | 30 | Ag (fcc, 61%) | $Ag_2O$ ($Cu_2O$-type, 39%) | 0.60 |
| Example 17 | 1.5 | 0.5 | Sintering in Oxygen | 700 | 30 | Ag (fcc, 70%) | $Ag_2O$ ($Cu_2O$-type, 28%) + unknown | 0.50 |

EXAMPLES 18 to 24

$Cu_2O$ powder and $Ag_2O$ powder each prepared by a wet process were used to prepare samples in Examples 18 to 24 by spark plasma sintering method.

In Example 22, a sintered body having a black appearance was produced only from $Cu_2O$ powder. As a result of structural analysis by X-ray diffraction performed thereon, there was no peak corresponding to $Cu_2O$ and it was confirmed to be almost changed to CuO. A reddish brown sintered body in Example 23 was broken when strongly pinched with tweezers. It was found by the structural analysis by X-ray diffraction that both $Cu_2O$ and CuO existed. As a result of structural analysis by X-ray diffraction, Ag was clearly precipitated in Example 24 and it was found that $Ag_2O$ was partially reduced by $Cu_2O$.

On the other hand, in Examples 18 to 21 in which the samples were produced by mixing $Cu_2O$ powder and $Ag_2O$ powder, hard sintered bodies of high strength were obtained in spite of low sintering temperatures. In all of these Examples 18 to 21, a peak corresponding to the fcc structure was observed, although a ratio of the intensity thereof with respect to the intensity corresponding to the main phase was small. This corresponds to Ag, and from consideration along with SEM observation results, it is thought that $Ag_2O$ is partially reduced by $Cu_2O$. In Examples 18 to 21, Ag is finely dispersed, and in Example 24, Ag is clearly precipitated and specific heat in a cryogenic temperature range is small. Example 22 and Example 23 are almost CuO, and thus specific heat in a cryogenic temperature range is small.

In Examples 18 to 21, two $Cu_2O$-type structures with different lattice constants corresponding to $Ag_2O$ and $Cu_2O$ were coexisted and dispersed throughout the samples.

TABLE 4

| | Starting materials | | Sintering | Sintering | Products | | |
| --- | --- | --- | --- | --- | --- | --- | --- |
| | | | | | Main compound phase (crystal | Other compound phase (crystal | |
| | $Cu_2O$ (g) | $Ag_2O$ (g) | temperature (° C.) | duration (min) | structure, volume fraction) | structure, volume fraction) | Strength |
| Example 18 | 1 | 1 | 280 | 8 | $Cu_2O$ ($Cu_2O$-type, 41%) | $Ag_2O$ ($Cu_2O$-type, 27%) + Others | High strength, hard |
| Example 19 | 1 | 1 | 200 | 3 | $Cu_2O$ ($Cu_2O$-type, 43%) | $Ag_2O$ ($Cu_2O$-type, 30%) + Others | High strength, hard |
| Example 20 | 0.5 | 1.5 | 230 | 8 | $Ag_2O$ ($Cu_2O$-type, 40%) | $Cu_2O$ ($Cu_2O$-type, 27%) + Others | High strength, hard |
| Example 21 | 0.15 | 1.85 | 200 | 3 | $Ag_2O$ ($Cu_2O$-type, 81%) | $Cu_2O$ ($Cu_2O$-type, 10%) + Others | High strength, hard |
| Example 22 | 2 | None | 900 | 10 | CuO (CuO-type, 100%) | Not more than Detection Limit | Hard |
| Example 23 | 2 | None | 700 | 30 | CuO (CuO-type, 65%) | $Cu_2O$ ($Cu_2O$-type, 23%) + Others | Broken when strongly pinched with tweezers |
| Example 24 | 1 | 1 | 400 | 30 | Ag (fcc, 36%) | $Cu_2O$ ($Cu_2O$-type, 25%) + Others | Hard |

EXAMPLES 25 and 26

Example 25

2 g of $Ag_2O$ powder prepared by a wet process was weighed and filled in a carbon die. The die was set up in a spark plasma sintering apparatus (SPS apparatus), and sintering was carried out under conditions of a pressure of 40 MPa, a temperature of 300° C. and a sintering duration of 10 minutes to obtain a cylindrical sintered body with a diameter of 10 mm. A photomask through which allowed light to be transmitted at a pitch of 0.5 mm was disposed above the sample, and the sample was partially irradiated with laser beam (Example 25). SEM image observation and SEM-EDX measurement were performed, and the results showed that Ag was precipitated in a region to which the laser beam irradiation was performed. As a result of the XRD measurement, a spectrum of $Ag_2O$ with a $Cu_2O$-type crystal structure and Ag was obtained.

Example 26

2 g of $Ag_2O$ powder synthesized by a wet process was weighed and filled in a metal die, and subsequently pressed using a hydraulic pressing machine to obtain pressurized powder. The pressurized powder was sintered in an Ar atmosphere under conditions shown in Table 5 given below. Then, laser beam irradiation was performed in the same manner as in Example 25 (Example 26). SEM image observation and SEM-EDX measurement were performed, and the results showed that Ag was precipitated in a region to which the laser beam irradiation was performed. As a result of the XRD measurement, a spectrum of $Ag_2O$ with a $Cu_2O$-type crystal structure and Ag was obtained.

The specific heat was measured in Examples 25 and 26, and consequently preferable specific heat properties were obtained compared to those in Example 8.

type crystal structure and the fcc structure was identified as a sub-phase, which corresponded to $Ag_2O$ and Ag, respectively; and the proportion of $Ag_2O$ was estimated at 88% by Rietveld analysis. Each of them had a relatively high ratio of density to the theoretical value, and high hardness and strength. High specific heat in proportional to the proportion of constitutive compounds was verified.

On the contrary, in Example 30 and Example 32, the structural analysis by X-ray diffraction showed that the main constituent substance had a $Cu_2O$ type crystal structure, and it was thought that an almost single phase of $Ag_2O$ was obtained; however, these had a low ratio of density to the theoretical value. A certain level of strength was obtained.

In Example 31, Example 33 and Example 34, the main constituent substance was identified to be Ag with the fcc structure. Since Ag was clearly precipitated and the $Ag_2O$ compound content was low, mechanical strength and specific heat were not evaluated.

Furthermore, a solution of sodium alginate was added to $Ag_2O$ powder in a small amount and the obtained mixture

TABLE 5

| | | | | Products | | |
|---|---|---|---|---|---|---|
| | Process | Sintering temperature (° C.) | Sintering duration (min) | Main compound phase (crystal structure, volume fraction) | Other compound phase (crystal structure, volume fraction) | Specific heat at 60 K (J/ccK) |
| Example 25 | Spark Plasma Sintering | 300 | 10 | $Ag_2O$ ($Cu_2O$-type, 92%) | Ag (fcc, 6%) + unknown | 1.14 |
| Example 26 | Sintering in Ar | 250 | 60 | $Ag_2O$ ($Cu_2O$-type, 84%) | Ag (fcc, 14%) + unknown | 1.13 |

EXAMPLES 27 to 38

To $Ag_2O$ powder synthesized by a wet process, pure water, ethanol and a solution of sodium alginate were each added in trace amounts and the obtained mixture was kneaded to produce particles with a diameter of about 0.2 to 1 mm, which were dried and then sintered to obtain Examples 27 to 34. Sintering was carried out in an oxygen atmosphere or a mixed atmosphere of oxygen and argon using a pressurized atmosphere furnace. The conditions of for example temperature, sintering duration and atmosphere pressure are shown in Table 6 given below.

For particles obtained under different conditions, the bulk density was measured and the load test and structure evaluation by X-ray diffraction were performed. A few tens of particles were considered as a group, and the bulk density was obtained from the volume and mass thereof by Archimedes method.

In Example 27 and Example 28, the result of the structural analysis of X-ray diffraction showed that the main constituent substance in the product had a $Cu_2O$ type crystal structure and an almost single phase of $Ag_2O$ was obtained. In Example 29, the main constituent substance had a $Cu_2O$ was kneaded. This was added dropwise to a solution of calcium chloride or a solution of calcium lactate from a nozzle to produce particles with a diameter of about 0.2 to 1.2 mm. These were dried and then sintered to obtain Examples 35 to 38. Sintering was carried out in the same method as above, and the obtained particles were evaluated in the same manner as above. The conditions and evaluation results are collectively shown in Table 6.

It was found by X-ray diffraction that in Example 35 and Example 36, the main constituent substance was $Ag_2O$ with a $Cu_2O$ type crystal structure. On the other hand, it was verified that in Example 37, AgCl with a NaCl type structure was produced, and in Example 38, Ag with the fcc structure was the main constituent substance. In Example 35 and Example 36, the ratio of the bulk density to the theoretical density was relatively high, and thus specific heat characteristics were good. On the contrary, in Example 37 and Example 38, it was verified by Rietveld analysis that the proportion of $Ag_2O$ was low. Since the $Ag_2O$ compound content was small, mechanical strength and specific heat were not evaluated. It is thought that volumetric specific heat is also low.

TABLE 6

| | Producing conditions | | | | | Crystal structure identified by XRD | | | |
| | Binder (Drop solution) | Sintering temp. (° C.) | Sintering duration (min) | Atmosphere | Pressure (MPa) | Theoretical density ratio (%) *1 | Main compound phase (Substance) | Other compound phase (Substance) | Ratio of Cu2O-type phase *2 | Strength, Other special instructions |
|---|---|---|---|---|---|---|---|---|---|---|
| Example 27 | Pure water | 260 | 30 | Oxygen + Argon | 100 | 85 | $Cu_2O$-type ($Ag_2O$) | Not more than Detection Limit | Almost single layer | High strength, hard |
| Example 28 | Ethanol | 260 | 30 | Oxygen + Argon | 100 | 84 | $Cu_2O$-type ($Ag_2O$) | Not more than Detection Limit | Almost single layer | High strength, hard |
| Example 29 | Sodium Alginate Solution | 270 | 50 | Oxygen + Argon | 100 | 88 | $Cu_2O$-type ($Ag_2O$) | fcc (Ag) | 88% | High strength, hard |
| Example 30 | Pure water | 300 | 30 | Oxygen | 0.1 | 42 | $Cu_2O$-type ($Ag_2O$) | Not more than Detection Limit | Almost single layer | Hard |
| Example 31 | Pure water | 260 | 60 | Oxygen + Argon | 0.1 | 65 | fcc (Ag) | $Cu_2O$-type ($Ag_2O$) | 31% | Not evaluated because the amount of desired Ag2O compound is low |
| Example 32 | Ethanol | 300 | 30 | Oxygen | 0.1 | 47 | $Cu_2O$-type ($Ag_2O$) | Not more than Detection Limit | Almost single layer | Hard |
| Example 33 | Sodium Alginate Solution | 300 | 30 | Oxygen | 0.1 | — | fcc (Ag) | $Cu_2O$-type ($Ag_2O$) | 32% | Not evaluated because the amount of desired Ag2O compound is low |
| Example 34 | Sodium Alginate Solution | 260 | 60 | Oxygen + Argon | 0.1 | — | fcc (Ag) | $Cu_2O$-type ($Ag_2O$) | 24% | Not evaluated because the amount of desired Ag2O compound is low |
| Example 35 | Calcium Chloride Solution | 330 | 30 | Oxygen + Argon | 100 | 91 | $Cu_2O$-type ($Ag_2O$) | fcc (Ag) | 90% | High strength, hard |
| Example 36 | Calcium Lactate Solution | 330 | 30 | Oxygen + Argon | 100 | 88 | $Cu_2O$-type ($Ag_2O$) | fcc (Ag) | 88% | High strength, hard |
| Example 37 | Calcium Chloride Solution | 280 | 30 | Oxygen | 0.1 | — | NaCl (AgCl) | fcc (Ag) + $Cu_2O$-type ($Ag_2O$) | 24% | Not evaluated because AgCl and Ag other than desired Ag2O compound are clearly precipitated |
| Example 38 | Calcium Lactate Solution | 260 | 60 | Oxygen + Argon | 0.1 | — | fcc (Ag) | $Cu_2O$-type ($Ag_2O$) | 33% | Not evaluated because Ag other than desired Ag2O compound are clearly precipitated |

*1 Theoretical density ratio: ratio of product density to Ag2O theoretical density
*2 Based on Rietveld analysis of XRD results In the above-mentioned examples, specific heat in proportional to the ratio of the main compound phase and other compound phases in a product was observed. It was verified that in a composite material containing different compound phases described in Examples and Comparative Examples, the specific heat of the material was the sum of specific heat of compounds contained. The specific heat per unit volume is obtained from the sum of the specific heat and the density.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A cryogenic regenerator, which is filled with a cryogenic regenerator material containing as a main constituent at least one compound (A), wherein a half width of a main peak obtained by a powder X-ray diffraction measurement on the compound (A) is 0.2 degrees or more, wherein said at least one compound (A) is represented by a composition formula $Ma_2X$ or $MbW_2X_8$, wherein, in the composition formulae, Ma represents a metallic element selected from Cu, Ag, Au, Pd and Pt, or two or more metallic elements comprising at least one selected from Cu, Ag, Au, Pd and Pt as the main constituent element, Mb represents a metallic element selected from Zr and Hf, or two or more metallic elements comprising at least one selected from Zr and Hf as the main constituent element, and X represents at least one non-metallic element selected from O, S and N.

2. The cryogenic regenerator of claim 1, wherein the cryogenic regenerator material is a bulk body.

3. The cryogenic regenerator of claim 1, wherein the cryogenic regenerator material contains the compound (A) in an amount of 40% or more with respect to the whole volume of the cryogenic regenerator material.

4. The cryogenic regenerator of claim 1, wherein a density of the cryogenic regenerator material is 60% or more with respect to a theoretical density of the compound (A).

5. The cryogenic regenerator of claim 1, wherein the compound (A) has a crystal structure containing at least one unit structure selected from a tetrahedral framework and octahedral framework each comprising the at least one non-metallic element X and the at least one metallic element Ma or Mb, wherein the tetrahedral framework and the octahedral framework are such that each vertex is occupied by the metallic element Ma or Mb with the center occupied by the non-metallic element X, or each vertex is occupied by the non-metallic element X with the center occupied by the metallic element Ma or Mb.

6. The cryogenic regenerator of claim 5, wherein the compound (A) comprises two or more unit structures selected from the tetrahedral framework and the octahedral framework in the crystal structure, and at least one of the unit structures shares one vertex with at least one neighboring unit structure.

7. The cryogenic regenerator of claim 1, wherein the compound (A) has a negative thermal expansion coefficient in a whole temperature range from 4 K to 100 K.

8. The cryogenic regenerator of claim 1, wherein the cryogenic regenerator material further contains a substance with a positive thermal expansion coefficient in a temperature range from 4 K to 100 K.

9. The cryogenic regenerator of claim 1, wherein the cryogenic regenerator material further contains a ductile metal.

10. The cryogenic regenerator of claim 1, wherein the cryogenic regenerator material further contains a material with a higher thermal conductivity than that of the compound (A).

11. The cryogenic regenerator of claim 1, containing at least one compound (A) represented by the composition formula $Ma_2X$.

12. The cryogenic regenerator of claim 1, wherein the half width of the main peak obtained by a powder X-ray diffraction measurement on compound (A) is 0.2 degrees –3 degrees.

13. A regenerative cryocooler comprising the cryogenic regenerator of claim 1.

14. A system comprising the regenerative cryocooler of claim 13.

15. The cryogenic regenerator of claim 1, wherein the half width of the main peak obtained by a powder X-ray diffraction measurement on compound (A) is 0.3 degrees –2.5 degrees.

16. The system of claim 14, wherein said system is a superconducting magnet apparatus, a magnetic resonance imaging (MRI) apparatus, a cryopump apparatus, a Josephson voltage standard system, or a magnetic field-applied single crystal pulling apparatus.

17. The cryogenic regenerator of claim 1, containing at least one compound (A) represented by the composition formula $MbW_2X_8$.

* * * * *

UNITED STATES PATENT AND TRADEMARK OFFICE
CERTIFICATE OF CORRECTION

| | |
|---|---|
| PATENT NO. | : 10,393,412 B2 |
| APPLICATION NO. | : 15/263584 |
| DATED | : August 27, 2019 |
| INVENTOR(S) | : Masaki Endo et al. |

It is certified that error appears in the above-identified patent and that said Letters Patent is hereby corrected as shown below:

On the Title Page

Item (54) and in the Specification, Column 1 Lines 1-5, the Title is incorrect. The Title should read:
-- CRYOGENIC REGENERATOR MATERIAL, CRYOGENIC REGENERATOR, REGENERATIVE CRYOCOOLER AND SYSTEM COMPRISING REGENERATIVE CRYOCOOLER --

Signed and Sealed this
Twenty-first Day of April, 2020

Andrei Iancu
*Director of the United States Patent and Trademark Office*